United States Patent [19]

Ogawa et al.

[11] Patent Number: 5,190,832
[45] Date of Patent: Mar. 2, 1993

[54] ALLOY AND COMPOSITE STEEL TUBE WITH CORROSION RESISTANCE IN COMBUSTION ENVIRONMENT WHERE V, NA, S AND CL ARE PRESENT

[75] Inventors: Hiroyuki Ogawa; Tetsuo Ishitsuka; Kozo Denpo; Akihiro Miyasaka; Koichi Takeda, all of Kanagawaken; Satoshi Araki, Yamaguchiken, all of Japan

[73] Assignee: Nippon Steel Corporation, Tokyo, Japan

[21] Appl. No.: 811,066

[22] Filed: Dec. 20, 1991

[30] Foreign Application Priority Data

Dec. 21, 1990 [JP] Japan .................. 2-405285

[51] Int. Cl.$^5$ .................. C22C 3/00; B32B 15/00
[52] U.S. Cl. .................. 428/678; 138/177; 138/DIG. 6; 420/585; 420/440
[58] Field of Search .................. 138/177, DIG. 6, 143, 138/140; 428/678, 679; 420/585, 440

[56] References Cited

U.S. PATENT DOCUMENTS 3,268,327  8/1966  Binder .................. 420/585
4,463,061  7/1984  Otoguro et al. .................. 138/143

FOREIGN PATENT DOCUMENTS 686180  1/1953  United Kingdom .................. 420/585

OTHER PUBLICATIONS

Key to Steels, 10 Edition 1974, West Germany.

Primary Examiner—Deborah Yee
Attorney, Agent, or Firm—Wenderoth, Lind & Ponack

[57] ABSTRACT

An alloy exhibiting corrosion resistance in a combustion environment where V, Na, S and Cl are present comprises, in weight percent, not more than 0.05% C, 0.02–0.5% Si, 0.02–0.5% Mn, 15–35% Cr, 0.5–4% Mo, more than 40% but not more than 60% Co, 5–15% Fe, 0.5–5% W, 0.0003–0.005% Ca and the remainder of Ni at a content of not less than 4% and unavoidable impurities, provided that Cr (%)+0.5Ni (%)+3Mo (%)≧30 (%). A composite steel tube exhibiting corrosion resistance in a combustion environment where V, Na, S and Cl are present comprises an inner tube constituted of Cr-containing boiler tube and an outer tube constituted of the alloy.

2 Claims, 3 Drawing Sheets

C: [80°C SOLUTION OF 20% NaCl + 0.1% FeCl$_3$ EXPOSED TO THE ATMOSPHERE]

A : [ 30%V$_2$O$_5$ +30%Na$_2$SO$_4$ +20%NaCl +20% Fe$_2$O$_3$ ]

B : ( 30%NaCl + 20% Na₂SO₄ + 50% FeCl₂ )

C: [80°C SOLUTION OF 20% NaCl+0.1% FeCl$_3$ EXPOSED TO THE ATMOSPHERE]

ALLOY AND COMPOSITE STEEL TUBE WITH CORROSION RESISTANCE IN COMBUSTION ENVIRONMENT WHERE V, NA, S AND CL ARE PRESENT

BACKGROUND OF THE INVENTION

1. Field of the Invention

This invention relates to a steel alloy for a tube for use in a combustion atmosphere where V, Na, S and Cl are present, e.g. in the combustion atmosphere of a boiler burning heavy oil, tar, coal or the like or of a garbage incinerator, more particularly to a composite steel tube exhibiting hot corrosion resistance and hot erosion resistance in the presence of $V_2O_5$, $Na_2SO_4$ and NaCl formed in such an environment.

2. Description of the Prior Art

It is well known that the oxides $V_2O_5$ and $Na_2SO_4$ which form when crude oil, heavy oil or the like is burned in a boiler or other such combustion system build up oxide scale on the systems where they form low-melting-point compounds which induce a type of local corrosive oxidation known as "vanadium attack". The literature in this field points out that alloys of Cr, Ni, Co etc. exhibit a certain amount of resistance to these types of corrosion (see *Iron and Steel*, Vol. 67, Page 996, for example).

A number of processes have been proposed for production of composite steel tube. In one of these an alloy cladding material is provisionally attached to a carbon or low-alloy steel, the result is subjected to hot rolling to obtain a clad steel plate and the clad steel plate is formed into composite steel tube by submerged arc welding or the like. There have also been proposed methods or directly metal cladding a finished product to obtain a composite steel tube. For example, Japanese Patent Public Disclosure Sho 61-223106 discloses a method of directly producing a final composite steel tube by fixing a high-alloy powder to a metal material by hot isostatic pressing.

In thermal power plants and the like which use the energy released by burning a fossil fuel or garbage, when the fuel is tar, coal, heavy oil or garbage containing plastic materials, the combustion products of the fuel often contain large amounts of V, Na, S and Cl. These elements in turn cause low-melting-point compounds containing $V_2O_5$, $Na_2SO_4$, NaCl and the like to form on the surfaces of the furnace wall tubes, steam superheating tubes etc. of the thermal power or incineration facility. As a result, the scale formed on the tube surfaces melts and causes hot corrosion. Over long periods of operation this causes breakage of the furnace wall tubes, steam superheating tubes etc.

Moreover, in the case of a dedicated coal-fired boiler or a garbage incinerator/power plant of the fluidized bed furnace type, accelerated hot corrosion of the furnace wall tubes, the steam superheating tubes etc. is caused by the hot erosive effect of the ash or bed sand.

SUMMARY OF THE INVENTION

The object of this invention is to provide, at low cost, an alloy which exhibits high corrosion resistance in a high-temperature combustion environment where $V_2O_5$, $Na_2SO_4$, NaCl and the like are present, an alloy which exhibits steam oxidation resistance in such an environment, and composite steel tubes externally clad with these alloys.

Research conducted by the inventors showed that the corrosion resistance of an alloy in an environment in which $V_2O_5$, $Na_2SO_4$, NaCl and the like tend to find their way into an oxide scale formed on the alloy surface is dependent not only on the alloy's Cr content but also on its combination of Ni, Co, Fe and Mo contents.

The corrosion resistance of an alloy in a high-temperature oxidative environment involving a large amount of $O_2$ generally increases with increasing Cr content. In power plants that burn crude oil, heavy oil, tar, coal or the like and in garbage incinerator/power plants, however, the $O_2$ content of the combustion atmosphere is reduced in order to decrease the amount of NOx generated. The inventors found that high Cr content alloys do not necessarily exhibit corrosion resistance in such an environment.

In an environment in which $V_2O_5$, $Na_2SO_4$, NaCl and the like form in the scale that deposits on the alloy surface, low-melting-point compounds (e.g. eutectic compounds such as $Na_2O.V_2O_5$) form in the scale.

As a result, the protective scale covering the alloy surface melts away locally, enabling corrosion to proceed at an abnormally high rate. Moreover, as was mentioned earlier, the corrosion is further accelerated by the hot corrosion effect of bed sand, coal ash and the like.

Through their research, the inventors discovered that the local melting of the scale starts when the alloy scale (e.g. $Fe_2O_3$) dissolves into the molten low-melting-point compounds such as $Na_2O.V_2O_{54}$ that form in the scale. From this it was concluded that the corrosion-resistance of an alloy used in such an environment can be effectively enhanced by ensuring formation of a scale of a composition which does not easily dissolve into the aforesaid molten low-melting-point compounds. In other words, they concluded that it is necessary to establish an alloy composition which forms a scale having such a composition.

The invention defines such alloy compositions for use in steel tube to be used in a the 400°-700° C. range. This is a temperature range in which various precipitates form. Since the carbides among these precipitates act to form low-melting-point compounds, they work to increase the amount of corrosion. This is particularly true when they are precipitated continuously (at the grain boundaries, for instance). The C content of the tube cladding therefore has to be kept low.

For imparting hot erosion resistance, it is necessary to strengthen the matrix and suppress the formation of large precipitates. Growth of precipitated intermetallic compounds and carbo-nitrides, either at the grain boundaries or inside the grains, degrades the hot erosion resistance property. This make it necessary to reduce the content of metals which form or promote the formation of these precipitates. What is required is an alloy design which, like that to be set out later, is able to satisfy both the need for suppressing precipitates and the need for high-temperature strength.

The combustion environment discussed above also includes NaCl. Therefore, when the temperature of the environment falls to the new point after the facility has been temporarily shut down for maintenance or the like, the water vapor of the environment condenses and dissolves NaCl contained in the environment, thereby forming a high-concentration NaCl solution environment. Invasion of the condensed water into cracks in the scale leads to crevice corrosion at the bottom surface of the scale. Since tube breakage is just as likely to occur under this condition as duriing high-temperature operation, this problem also has to be coped with.

Since the inner surface of the composite steel tubes according to the invention are ordinarily exposed to a steam environment, the inner tube material of the composite steel tube is required to possess oxidation resistance in a steam environment.

The tubes ordinarily used for the superheaters etc. of thermal power plants are STBA20, STBA26 and other alloy tubes containing 0.5-10% Cr as prescribed by JIS G3462, and austenitic steel tubes, such as SUS304TB, 321TB, 316TB and 374TB, which contain 18% Cr and 9-14% Ni as prescribed by JIS G3463. The present invention also uses the alloys prescribed for these boiler tubes as the inner tube material.

In view of the foregoing findings, the present invention achieves its object by providing in accordance with a first aspect an alloy exhibiting corrosion resistance in a combustion environment where V, Na, S and Cl are present comprising, in weight percent, not more than 0.05% C, 0.02-0.5% Si, 0.02-0.5% Mn, 15-35% Cr, 0.5-4% Mo, more than 40% but not more than 60% Co, 5-15% Fe, 0.5-5% W, 0.0003-0.005% Ca and the remainder of Ni at a content of not less than 4% and unavoidable impurities, provided that Cr (%)+0.5 Ni (%)+3 Mo (%)≧30 (%), in accordance with a second aspect a composite steel tube exhibiting corrosion resistance in a combustion environment where V, Na, S and Cl are present comprising an inner tube constituted of Cr-containing boiler tube and an outer tube constituted of the alloy according to the first aspect.

DETAILED DESCRIPTION OF THE PREFERRED EMBODIMENTS

Figure 1:
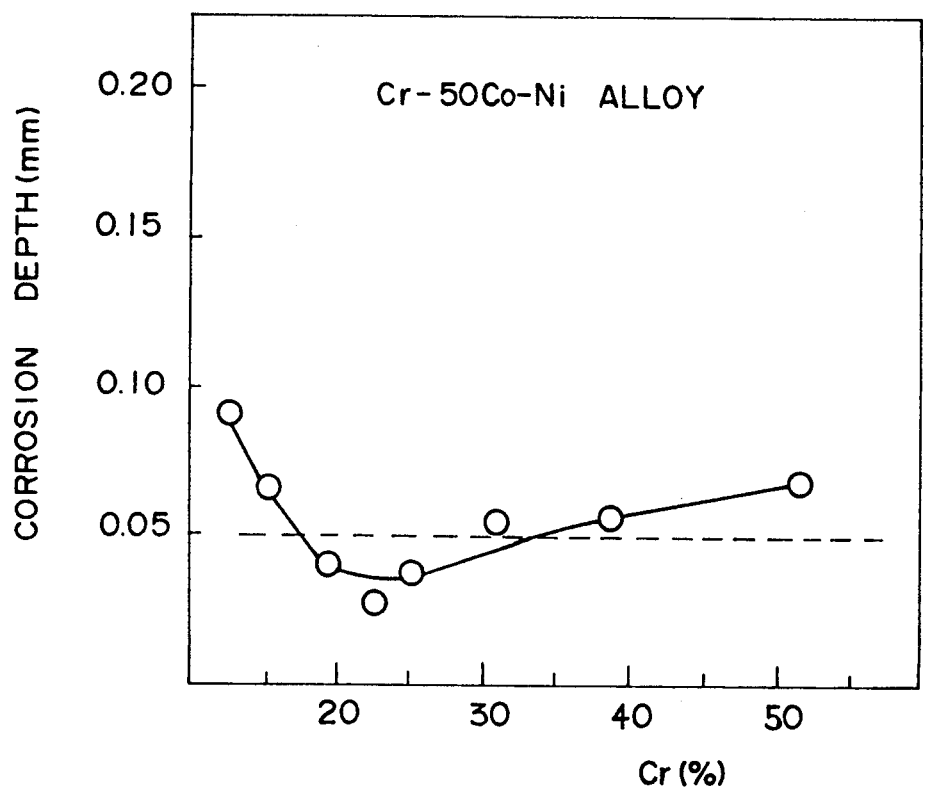
FIG. 1 is a graph showing the effect of Cr content on the depth of corrosion occurring in a low-melting-point scale environment.
Figure 2:
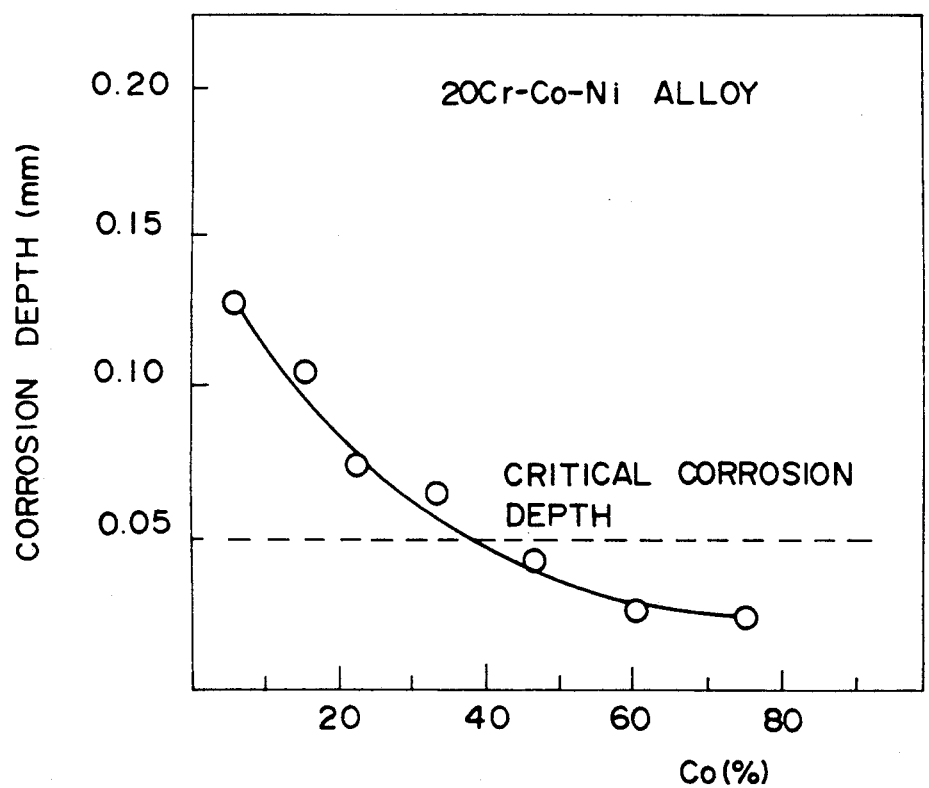
FIG. 2 is a graph showing the effect of Co content on the depth of corrosion occurring in a low-melting-point scale environment.
Figure 3:
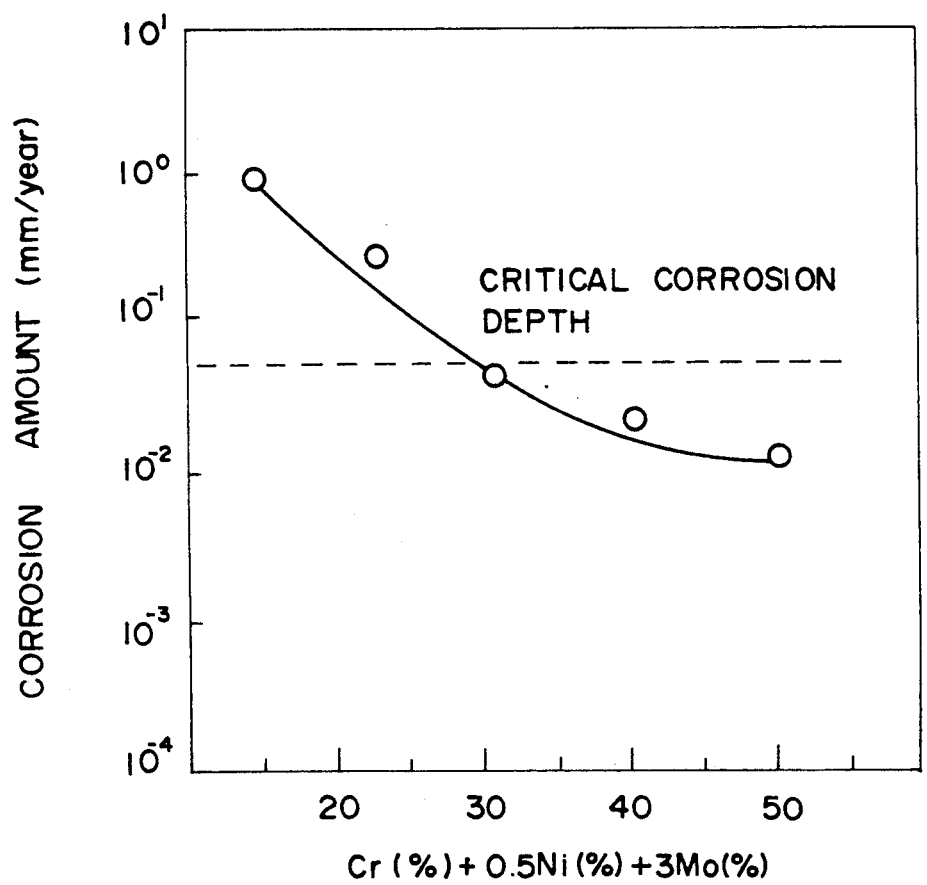
FIG. 3 is a graph showing the effect of Cr (%)+0.5 Ni (%)+3 Mo (%) on crevice corrosion in a simulated condensed water environment.

FIGS. 1, 2 and 3 indicate the results of corrosion tests conducted in an environment established to simulate the environment in which the outer tube of the composite steel tube according to the invention is intended for use.

The first tests were carried out by holding a specimen provided on its surface with a 1 mm thick simulated low-melting-point scale consisting of 30% $V_2O_5$+30% $Na_2SO_4$+20% NaCl+20% $Fe_2O_3$ (environment A) or 30% NaCl+20% $Na_2SO_4$+50% $FeCl_2$ (environment B) at 700° C. in atmospheric air for 24 hrs. These tests made it possible to evaluate resistance to abnormal corrosion caused by low-melting-point scale.

The second test was carried out by immersing overlaid specimens in an 80° C. solution of 20% NaCl+0.1% $FeCl_3$ exposed to the atmosphere for 200 hrs (environment C). This test made it possible to evaluate resistance against crevice corrosion caused by condensed water at the bottom surface of the scale.

From FIG. 1 showing the effect of Cr content on corrosion depth in environment A of the test, it can be concluded that the optimum Cr content range is 15-35%.

From FIG. 2 showing the effect of Co content on corrosion depth in environment B of the test, it can be concluded that the Co content has to be greater that 40% for securing adequate corrosion resistance.

From FIG. 3 showing the effect of Cr, Ni and Mo content on crevice corrosion in environment C, it can be concluded the Cr+0.5 Ni+3 Mo has to be not less than 30% for securing adequate crevice corrosion resistance.

The reason for the limits placed on the constituents of the corrosion resistant alloy used for the outer tube will now be explained.

C: Carbides act as starting points for abnormal corrosion induced by low-melting-point scale. It is particularly important to suppress continuous precipitation of carbides at the grain boundaries. The C content is therefore reduced during production to not more than 0.05%.

Si: Si is frequently added to alloys for increasing oxidation resistance. However, since Si promotes the activity of C in an alloy, which increases the amount of carbides precipitated, its content has to be held to a low level in this invention. However, some Si must be added to act as a deoxidizer at the time of alloy production. As the deoxidizer effect of Si is inadequate at contents below 0.02% and saturates at above 0.5%, the invention defines the Si content as not less than 0.02% and not more than 0.5%.

Mn: Like Si, Mn also has to be added to serve as a deoxidizer during alloy production. Since the deoxidizer effect of Mn is too low at contents below 0.02% and saturates at above 0.5%, the invention defines the Mn content as not less than 0.02% and not more than 0.5%.

Cr: Cr is one of the main elements contributing to the formation of a corrosion resistant oxide film that suppresses abnormal corrosion induced by the formation of low-melting-point scale. However, Cr is also both a ferrite forming element which forms delta-ferrite during alloy production, and a strong carbide forming element. As delta-ferrite and carbides are causes of abnormal corrosion, excessive addition of Cr tends to degrade corrosion resistance rather than improve it. As shown by FIG. 1, the optimum Cr content range is 15-35%. On the other hand, Cr is an effective element for enhancing resistance against crevice corrosion caused by condensed water. As shown by FIG. 3, for ensuring crevice corrosion resistance it is necessary to establish a relationship between Cr, Ni and Mo such that Cr+0.5 Ni+3 Mo≧30.

Ni: Like Cr and Co, Ni is also one of the main elements contributing to the formation of a corrosion resistant oxide film. In this invention Ni is added to work together with Co to maintain an austenitic structure. As shown by FIG. 3, Ni cooperates with Cr and Mo for ensuring resistance against crevice corrosion caused by condensed water. For this purpose it has to be present at not less than 4% and in such relationship with Cr and Mo that Cr+0.5 Ni+3 Mo≧30.

Mo: As shown by FIG. 3, for ensuring resistance against crevice corrosion caused by condensed water, Mo is added together with Cr and Ni so as to establish the relationship Cr+0.5 Ni+3Mo≧30. However, since excessive addition of Mo leads to precipitation of intermetallic compounds and thus degrades resistance to abnormal corrosion induced by low-melting-point scale, the maximum Mo content is set at 4%. Together with Co and W, Mo is also an effective constituent for ensuring hot erosion resistance. Since no corrosion resistance or hot erosion resistance effect is obtained at a content of less than 0.5%, the lower Mo content limit is set at 0.5%.

Co: Co constitutes an effective element for ensuring corrosion resistance and hot erosion resistance against abnormal corrosion induced by low-melting-point scale. As shown by FIG. 2, a content in excess of 40% is required for achieving adequate corrosion resistance. Since its corrosion resistance promoting effect saturates at content levels exceeding 60%, however, the optimum range of Co content is defined as more than 40% but not more than 60%.

Fe: While Fe itself does not produce resistance against abnormal corrosion induced by low-melting-point scale, it does promote the formation of a stable, spinel-type corrosion resistant oxide film. Since it degrades corrosion resistance when added to excess, however, its content is defined as within the range of 5-15%.

W: W is added for imparting hot erosion resistance to the alloy according to the invention. When present at more than 5% it causes precipitation of intermetallic compounds and thus degrades resistance to abnormal corrosion induced by low-melting-point scale. When present at less than 0.5% it does not enhance resistance to hot erosion. The range of W content is therefore defined as 0.5%-5%.

Ca: As will be explained later, the composite steel tube according to the invention can be produced from a composite billet obtained by pressure-binding powder of the outer tube alloy according to the invention to a billet for the inner tube by hot isostatic pressing. In such cases the alloy according to the invention is reduced to a powder after it is produced. If Al and/or Ti are used as deoxidizer during alloy production, Al oxides, Ti nitrides and the like will precipitate at the molten metal ejection nozzle during powder production. Since this would hinder powder production, the invention uses Ca together with Si as deoxidizer during alloy production. However, since use of a large amount of Ca leads to cause formation of Ca sulfides and Ca oxides which degrade resistance against crevice corrosion caused by condensed water, the maximum Ca content is defined as 0.005%. Since no deoxidizing effect is obtained at below 0.0003%, the Ca content range is defined as 0.0003-0.005%.

The method of producing a composite steel tube according to the invention will now be explained.

A powder of the outer tube alloy according to the invention is attached by hot isostatic pressing (HIP) to the surface of an inner tube stainless steel billet produced by the ordinary steelmaking and casting processes for stainless steel. After being soaked, the resulting composite steel tube billet is formed to a prescribed size by hot extrusion.

Where a plate or tube material is used for the outer tube, alloy powder is not attached to the inner tube stainless steel billet by HIP but instead the plate or tube having the composition of the outer material is wound over or embedded in the surface of the billet and the outer tube material and the inner tube billet are welded together. The resulting composite steel tube billet is then used in the above-described manner for producing a composite steel tube.

The method of producing the composite steel tube according to the invention is not limited to the foregoing and it is alternatively possible to use various other methods, including the prior art composite (laminated) steel tube production method.

The present invention also encompasses the case where the alloy according to the invention is laminated to obtain tubes or similarly shaped members suitable for high-temperature applications (e.g. nozzles for blowing air or fuel) by LPPS (low pressure plasma spray) or other such flame spraying method.

EXAMPLE

Examples of the invention are shown in Table 1 (which show the chemical compositions of alloys produced according to the invention and comparative examples) and Table 2 (which show the results of tests carried out on the invention and comparative example alloys).

The critical corrosion depth of the alloy according to the invention is 0.05 mm.

TABLE 1

| No. | | Chemical composition (wt %) | | | | | | | | | |
|---|---|---|---|---|---|---|---|---|---|---|---|
| | | C | Cr | Co | Fe | Mo | W | Si | Mn | Ni | Ca |
| 1 | Invention | 0.025 | 21 | 50 | 7 | 3.2 | 1.2 | 0.15 | 0.16 | Bal | 0.003 |
| 2 | " | 0.029 | 30 | 43 | 6 | 1.1 | 1.8 | 0.18 | 0.15 | Bal | 0.003 |
| 3 | " | 0.027 | 19 | 60 | 5 | 3.6 | 0.7 | 0.11 | 0.17 | Bal | 0.002 |
| 4 | " | 0.018 | 25 | 58 | 8 | 2.1 | 4.3 | 0.09 | 0.13 | Bal | 0.004 |
| 5 | Comparison | 1.381 | 20 | 50 | 2 | 0.1 | 3.5 | 2.1 | 0.52 | Bal | — |
| 6 | " | 0.043 | 12 | 48 | 25 | 3.4 | 1.3 | 1.2 | 0.42 | Bal | — |
| 7 | " | 0.031 | 24 | 60 | 3 | 0.3 | 1.8 | 1.6 | 0.48 | Bal | — |
| 8 | " | 0.035 | 30 | 5 | 16 | 1.0 | 1.5 | 0.52 | 0.46 | Bal | — |

TABLE 2

| No. | | Amount of corrosion | | |
|---|---|---|---|---|
| | | A (mm) | B (mm) | C (mm/year) |
| 1 | Invention | 0.042 | 0.043 | 0.025 |
| 2 | " | 0.040 | 0.038 | 0.046 |
| 3 | " | 0.047 | 0.043 | 0.043 |
| 4 | " | 0.030 | 0.028 | 0.040 |
| 5 | Comparison | 0.058 | 0.061 | 0.082 |
| 6 | " | 0.076 | 0.068 | 0.120 |
| 7 | " | 0.041 | 0.045 | 0.097 |
| 8 | " | 0.060 | 0.098 | 0.032 |

A: Simulated scale composition (30% $V_2O_5$ + 30% $Na_2SO_4$ + 20% NaCl + 20% $Fe_2O_3$)
B: Simulated scale composition (30% NaCl + 20% $Na_2SO_4$ + 50% $FeCl_2$)
C: Test liquid (80° C. solution of 20% NaCl + 0.1% $FeCl_3$ exposed to the atmosphere)

As will be understood from the foregoing description, the composite steel tube provided by the invention consists of an inner tube having corrosion resistance against steam oxidation and an outer tube consisting of an alloy having superior corrosion resistance against combustion environments produced by burning of fuels containing V, Na, S and Cl and against garbage and industrial waste incineration environments. The invention is therefore able to provide furnace wall tubes, steam superheating tubes and the like exhibiting high corrosion resistance when used in such environments.

What is claimed is:

1. An alloy exhibiting corrosion resistance in a combustion environment where V, Na, S and Cl are present consisting essentially of, in weight percent, not more than 0.05% C, 0.02-0.5% Si, 0.02-0.5% Mn, 15-35% Cr, 0.5-4% Mo, more than 40% but not more than 60% Co, 5-15% Fe, 0.5-5% W, 0.0003-0.005% Ca and the remainder of Ni at a content of not less than 4% and unavoidable impurities, provided that Cr (%)+0.5Ni (%)+3 Mo (%)≧30 (%).

2. A composite steel tube exhibiting corrosion resistance in a combustion environment where V, Na, S and Cl are present comprising an inner tube constituted of Cr-containing boiler tube and an outer tube constituted of the alloy according to claim 1.

* * * * *